United States Patent
Varone et al.

(10) Patent No.: US 8,469,267 B2
(45) Date of Patent: Jun. 25, 2013

(54) METHOD FOR IMPLEMENTING A WIRELESS PERSONAL COMMUNICATION PROTOCOL FOR AN IC CARD

(75) Inventors: Francesco Varone, Bellona (IT); Amedeo Veneroso, Caserta (IT)

(73) Assignee: Incard S.A., Geneva (CH)

( * ) Notice: Subject to any disclaimer, the term of this patent is extended or adjusted under 35 U.S.C. 154(b) by 274 days.

(21) Appl. No.: 12/439,228

(22) PCT Filed: Aug. 24, 2007

(86) PCT No.: PCT/EP2007/007440
§ 371 (c)(1),
(2), (4) Date: Oct. 6, 2010

(87) PCT Pub. No.: WO2008/025486
PCT Pub. Date: Mar. 6, 2008

(65) Prior Publication Data
US 2011/0011928 A1    Jan. 20, 2011

(30) Foreign Application Priority Data
Aug. 31, 2006 (EP) .................................. 06018178

(51) Int. Cl.
*G06K 5/00* (2006.01)
(52) U.S. Cl.
USPC .......................................... 235/380; 235/492
(58) Field of Classification Search
USPC .......................................... 235/375, 487, 492
See application file for complete search history.

(56) References Cited

U.S. PATENT DOCUMENTS

| 6,978,157 B1 | 12/2005 | Amiens .......................... 455/558 |
| 2004/0054817 A1 * | 3/2004 | Frey et al. .......................... 710/1 |
| 2004/0065734 A1 * | 4/2004 | Piikivi .......................... 235/451 |
| 2005/0109841 A1 | 5/2005 | Ryan et al. ..................... 235/280 |
| 2005/0207562 A1 * | 9/2005 | Nachef et al. ............ 379/357.01 |
| 2006/0085848 A1 | 4/2006 | Aissi et al. |
| 2006/0289659 A1 * | 12/2006 | Mizushima ................... 235/492 |
| 2007/0207798 A1 * | 9/2007 | Talozi et al. ................... 455/423 |
| 2008/0010675 A1 | 1/2008 | Massascusa et al. |
| 2008/0212971 A1 | 9/2008 | Shaanan et al. |
| 2009/0046677 A1 | 2/2009 | Toledano et al. |

FOREIGN PATENT DOCUMENTS

| EP | 1075155 A1 | 2/2001 |
| WO | 2005104584 A1 | 11/2005 |
| WO | 2006/045344 | 5/2006 |
| WO | 2006/056220 | 6/2006 |
| WO | WO 2006056220 A1 * | 6/2006 |

OTHER PUBLICATIONS

Anonymous, "Bluetooth enabled SIM-CARD," Research Disclosure, Mason Publications, Hampshire, GB, Nov. 2000, 2 pages.

* cited by examiner

*Primary Examiner* — Daniel St Cyr
(74) *Attorney, Agent, or Firm* — Allen, Dyer, Doppelt, Milbrath & Gilchrist, P.A.

(57) ABSTRACT

A method is for implementing a wireless personal communication protocol between an integrated circuit (IC) card and a reader device. The IC card is hosted in and in communication with a handset through a corresponding handset-IC card communication protocol. The method includes the handset transmitting an Application Protocol Data Unit (APDU) command to the IC card, according to the handset-IC card communication protocol, the IC card detecting an association between the APDU command and an applet stored inside the IC card, the IC card executing the APDU command, and the IC card executing the applet if an association between the APDU command and the applet is detected. The IC card detects data associated to a wireless personal communication with the reader device after the processing of the APDU command.

28 Claims, 8 Drawing Sheets

METHOD FOR IMPLEMENTING A WIRELESS PERSONAL COMMUNICATION PROTOCOL FOR AN IC CARD

FIELD OF THE INVENTION

This application is a 371 of PCT/EP07/07440 filed Aug. 24, 2007.

The present disclosure relates to a method for implementing a wireless personal communication protocol between an integrated circuit (IC) card and a reader device.

More particularly, the present disclosure relates to where the Application Protocol Data Unit (APDU) is a command set of IC card basic commands defined in ISO7816 and comprising in command/response messages between the IC card and the handset.

BACKGROUND OF THE INVENTION

As known in the field of Wireless Personal. Area Networks (WPANs), efforts are made to integrate in a single device a wireless personal communication protocol with one or more communication protocols already supported by such device. Such integration may enable the single device to support one or more communications with a first reader device and a wireless personal communication with a second reader device. The terms "first and second reader device" are used generally, but it should be understood that they are capable of further data manipulation, i.e. not only for reading data but also, for example, writing or updating data.

More particularly, designers plan to integrate inside a single microchip of a single device, a radio controller supporting the wireless personal communication protocol and a microcontroller supporting the one or more communication protocols, increasing interconnection capability and functionalities of the single device. The single device could also comprise two or more separate controllers, for example, a radio controller supporting the wireless personal communication protocol and a separate microcontroller supporting the one or more communication protocols.

For example, the Integration Company provides a single universal serial bus (USB) Dongle device that is compliant to the IEEE 802.15.4 wireless personal communication protocol. The USB Dongle may be quickly and easily connected to a host computer through a standard USB protocol and it is typically connected to a second external device based upon a wireless personal communication protocol, for example, to a wireless router, coordinator, or end device.

In the field of IC cards, a handset reader device and an IC card inside it communicate through an ICC-handset communication protocol, according to the ISO 7816 and ETSI TS 11.11 specifications. It may be useful to provide the IC card with appositely hardware and/or software able to support a wireless personal communication protocol, thereby integrating interconnection capability of the handset-IC card communication protocol with the interconnection capability, generally low power, of the wireless personal communication.

Further, according to the ISO 7816 and ETSI TS 11.11 specifications, a communication protocol between the IC card and the handset cannot be disturbed by communications with other reader devices. At the present, it is not known how to implement a wireless personal communication protocol between an IC card and a second reader device, the IC card being included and in communication with the mobile handset and communicating with it according to a specific communication protocol, for example, the ISO 7816 and ETSI TS 11.11 specification.

SUMMARY OF THE INVENTION

The object of the present invention is to provide a method for implementing a wireless personal communication protocol between an IC card, connected in a typical way to a handset, and a second reader device, for example, an external reader to the handset, without requiring a modification of the standard communication protocol at the base of the communication between such IC card and such handset.

Another object of the present invention is to provide an IC card communicating in a typical way to a mobile handset and communicating through the wireless personal communication method to a second reader device, the second reader being external to the handset.

One embodiment relates to a method for implementing a wireless personal communication protocol between an IC card and a reader device. The IC card is hosted in and in communication with a handset through a corresponding handset-IC card communication protocol.

The method provides at least a phase for detecting and processing data associated to a wireless personal communication between the IC card and the reader device, the phase of detecting and processing data being initiated after the processing of an APDU command sent by the handset to the IC card according to the handset-IC card communication protocol.

Another embodiment relates to a method for implementing a wireless personal communication protocol between an IC card and a reader device, the IC card being hosted in and in communication with a handset through a corresponding handset-IC card communication protocol. The method may comprise the following steps: the handset transmitting an APDU command to the IC card, according to the handset-IC card communication protocol; the IC card detecting an association between the APDU command and an applet stored inside the IC card; the IC card executing the APDU command; the IC card executing the applet if an association between the APDU command and the applet is detected; and the IC card detecting data associated to a wireless personal communication with the reader device, the phase of detecting data being executed after the processing of the APDU command.

Further characteristics and the advantages of the method according to the present invention may be apparent from the following description of an embodiment thereof, made with reference to the annexed drawings, given for indicative and non-limiting purpose.

DETAILED DESCRIPTION OF THE PREFERRED EMBODIMENTS

According to the present invention and with reference to the annexed drawings, a method for implementing a wireless personal communication protocol between an IC card and a second device is described. Such IC card is of the type intended to be hosted in a handset and in communication with it through a corresponding handset-IC card communication protocol. Without limiting the scope of the present disclosure, a ZigBee communication protocol is used to illustratively explain the wireless personal communication between the IC card and the second device.

A ZigBee communication protocol is part of an advantageous embodiment for implementing a wireless communication in an IC card due to its low hardware demands and low power consumption. Further, a different wireless personal communication protocol may be taken into consideration without altering the scope of the present disclosure. More particularly, the ZigBee communication protocol is a specification for a high level communication protocol based on small, low-power digital radios, complying with the IEEE 802.15.4 standard. The IEEE 802.15 standard is the 15th working group of the IEEE 802, specialized in standards relating to Wireless Personal Area Networks (WPANs). More particularly, the fourth section of such working groups IEEE 802.15.4, identified as Low Rate WPAN section, deals with low data rate and very long battery life.

A communication protocol according to the ZigBee specification is, for example, implemented for industrial, scientific, and medical radio bands, corresponding to 868 MHz in Europe, 915 MHz in the USA and 2.4 GHz in most locales worldwide. A network based on such communication protocol is intended to be simpler and cheaper than other WPANs, such as, Bluetooth. As a comparison, the most capable device implementing a communications protocol based on the ZigBee specification, hereinafter ZigBee node, uses only about 10% of the software resources of a typical Bluetooth or Wireless Internet device, and the simplest ZigBee nodes are about 2%.

More particularly, there are three different types of ZigBee device: (1) ZigBee coordinator (ZC), the most capable device intended to coordinate; it represents a root of a network tree and might bridge to other networks. There is exactly one ZigBee coordinator in each network, able to store information about the network, including acting as the repository for security keys. (2) ZigBee Router (ZR), acts as an intermediate router, passing data from other devices. (3) ZigBee End Device (ZED), the device contains just enough functionality to talk to its parent node, either the coordinator or a router; it cannot relay data from other devices. It uses the least amount of memory, and therefore may be less expensive to manufacture than the above mentioned ZR or ZC types.

Figure 7:
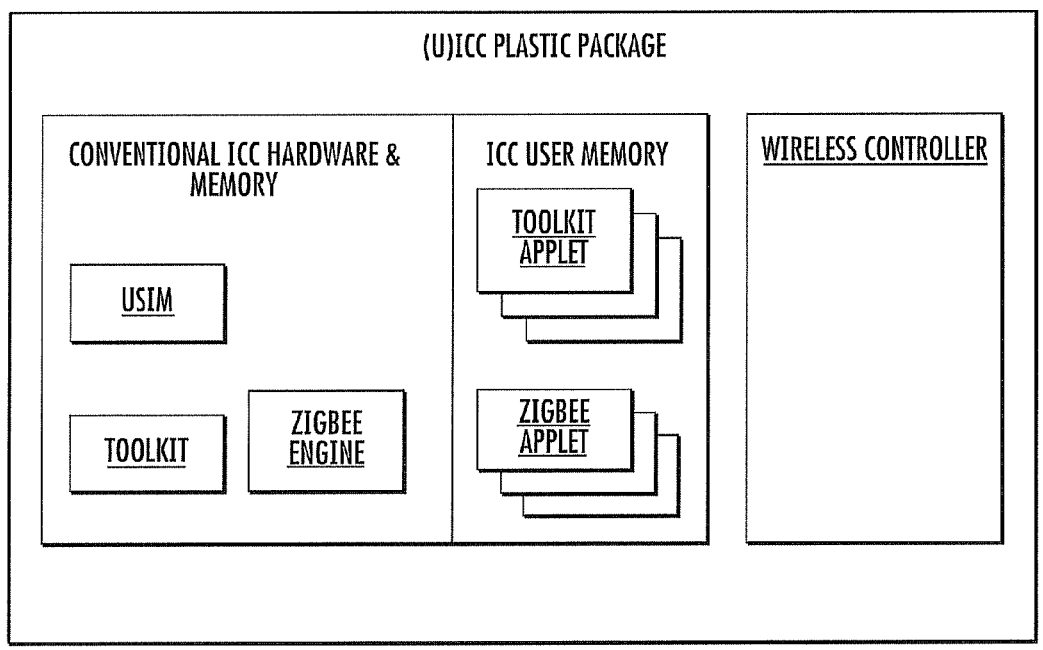
FIG. 7 schematically shows a possible deployment of various components described above in a single card, according to the present invention.

According to the present disclosure, a ZigBee wireless personal communication is provided between the IC card and the second device, for example, a ZigBee Router, a ZigBee Coordinator, or a ZigBee device and is described hereinafter. The IC card comprises, as shown schematically, in FIG. 7, a processor and two interfaces respectively based on two controllers: a serial line controller for managing the handset-IC card communication and a wireless controller for managing the wireless personal communication between the IC card and the second device. The serial line controller and the wireless controller may, for example, be implemented as a couple of hardware controller modules managing the flow of corresponding communication lines.

More particularly, when the processor is busy due to processing of a handset-IC card communication, the wireless controller temporary stores the corresponding communication with the second device in a portion of memory. On the contrary, when the processor is busy due to the processing of a wireless personal communication with the second device, the serial line controller temporary stores the corresponding communication. When the processor is able to process data, it checks both the controllers in order to process data previously received and temporary stored.

More particularly, according to the present disclosure, when an APDU command intended to drive the IC card is called by the handset device, a software module, hereinafter called ZigBeeEngine, is executed for processing data received from the ZigBee wireless personal communication. In the following description, such data received from the ZigBee wireless personal communication may also be referred as ZigBee messages, in order to distinguish it with respect to data related to the handset-IC card communication.

More particularly, the ZigBeeEngine is executed to parse the ZigBee message and to dispatch data extracted from it to a connection with the second device. In order to understand how the method provides the implementation of the ZigBee wireless personal communication through the ZigBeeEngine, a brief description of an additional module generally included in the IC card is briefly discussed. More particularly, a toolkit module in the IC card is in charge of detecting if an APDU command has the simple meaning of an APDU command or if it needs to be detected for further processing with respect to the behavior defined in the standard specification, being required by a specific use case.

For example, an APDU may be sent from the handset to the IC card in order to execute a simple file update. Further, in certain conditions, an APDU for updating such file also means that a special processing may be done, for instance, the validation of the file content to be updated. More generally, the toolkit is responsible for understanding if an APDU has a simple meaning or if it should embed a request for additional operations. Generally, the execution of one or more applets performs further silent processing or initiates a communication between the IC card and the handset, by which the IC card sends commands, called proactive commands and defined in ETSI TS 11.14, to the handset able to manage display, originate calls, send messages etc. Such applets, hereinafter indicated as toolkit applet, can be installed or removed during the life cycle of the IC card.

Figure 1:
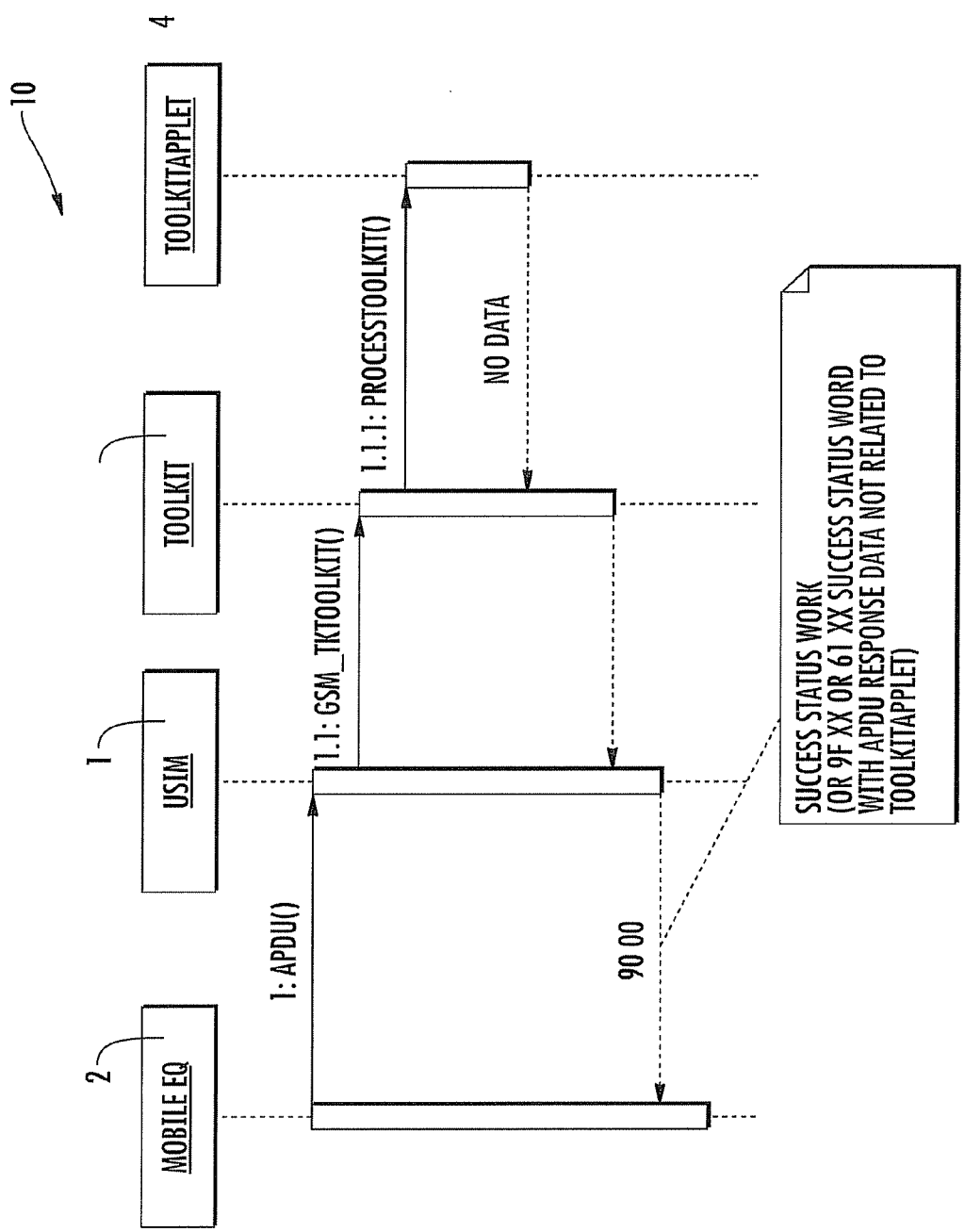
FIG. 1 is a schematic block diagram of a plurality of steps for communication between an IC card and a handset, according to the present invention.

According to the method, the toolkit is also responsible for activating an execution of the ZigBeeEngine in order to serve a wireless personal communication. With reference to FIG. 1, a communication between an IC card 1 and the corresponding handset 2 is schematically represented with numeral reference 10. The handset 2 sends an APDU command to the IC card 1 that calls a module toolkit 3 to execute such APDU command. The module toolkit 3 detects if the command received by the IC card is a simple APDU command or a special APDU command, in this last case requiring the execution of a corresponding toolkit applet 4. A reverse set of steps is executed to return data from the toolkit, eventually from the toolkit applet, to the handset.

Figure 2:
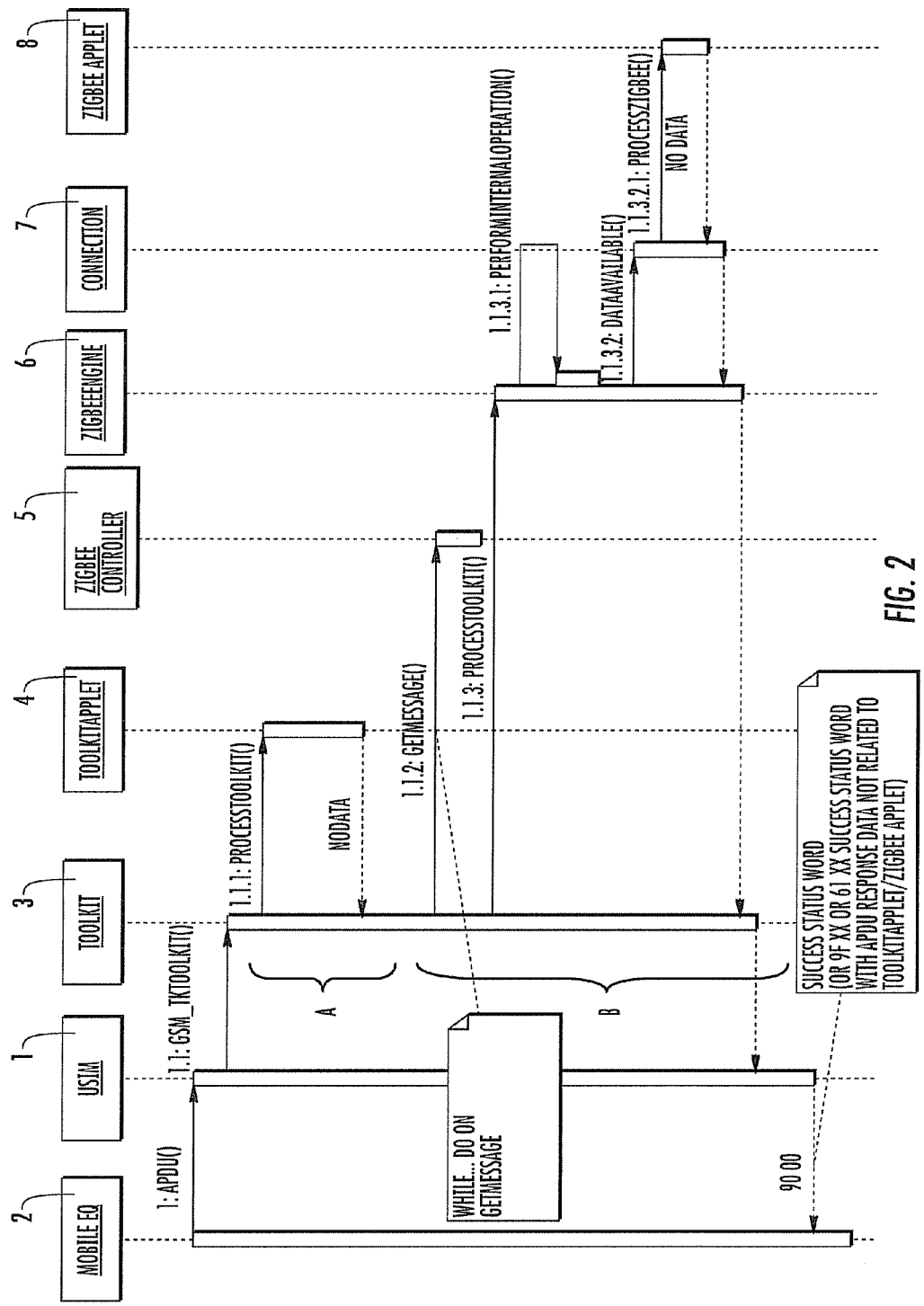
FIG. 2 is a schematic block diagram of a plurality of steps for communication between an IC card and a handset together with a plurality of steps for a wireless communication between an IC card and a second device, according to the present invention.

In the presence of a wireless personal communication, the sequence of steps schematically represented in FIG. 1 are interleaved through a plurality of additional phases, as described with reference to FIG. 2. As explained above, also in the presence of the wireless communication, the handset 2 sends an APDU command to the IC card 1 that calls a module toolkit 3 to execute such APDU command. The module toolkit 3 detects if the command received by the IC card is a simple APDU command or a special APDU command, for example, comprising an event that uses the execution of a corresponding toolkit applet 4.

After the event processing and the possible triggering of the toolkit applet 4, the toolkit module 3 checks the presence of events related to a ZigBee wireless communication, through a wireless controller 5. If one or more ZigBee messages related to a ZigBee wireless communication are received by the wireless controller 5, one of them is popped out and returned to a ZigBeeEngine 6.

The ZigBee message may, for example, bring information about the destination of a connection object 7, if such connection 7 has been already established from a lower implementation point-of-view. The connection object 7 may be considered an instance of a class identifying an open connection with a second device and a state of such connection.

After the detection of the ZigBee message, the wireless controller 5 may answer with one of the following return value: a connection bound message, in this case, the ZigBeeEngine 6 forwards the ZigBee message to a proper connection object 7; ZigBeeEngine bound message, in this case the ZigBeeEngine 6 processes the ZigBee message itself; and no message, in this case, no action is performed and the conventional IC card activity proceeds.

According to the method, a ZigBee applet 8 is an applet with a programming interface and life cycle similar to the interface of a toolkit applet 4 but adapted to a ZigBee wireless personal communication. Such a ZigBee applet 8 is programmed to react to events based on the ZigBee wireless personal communications, as well as a toolkit applet 4 may react to a specific APDU command.

Figure 3:
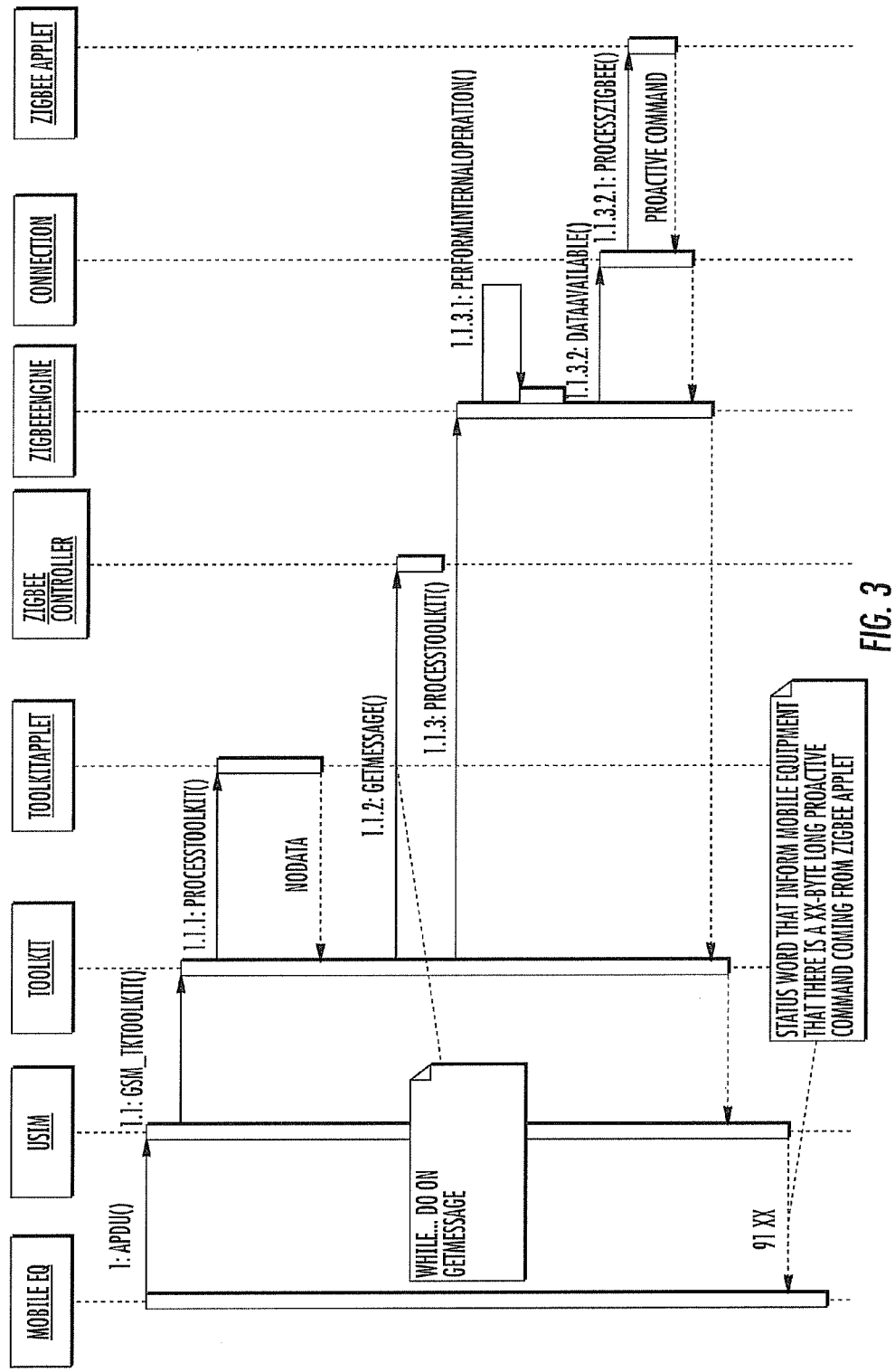
FIG. 3 is a schematic block diagram of a plurality of steps for a wireless communication between an IC card and a second device, the steps comprising an execution of a wireless service applet, according to the present invention.

According to the present disclosure, the ZigBee applet 8 is also programmed to send proactive commands to the toolkit 3, as schematically represented in FIG. 3. The toolkit 3 calls a toolkit applet 4, but no proactive command is executed. The Zengine 6 may perform internal operations, call a ZigBee applet 8 or receive data from a wireless connection 7. In this case, the ZigBee applet 8 is also allowed to send a proactive command.

Figure 4:
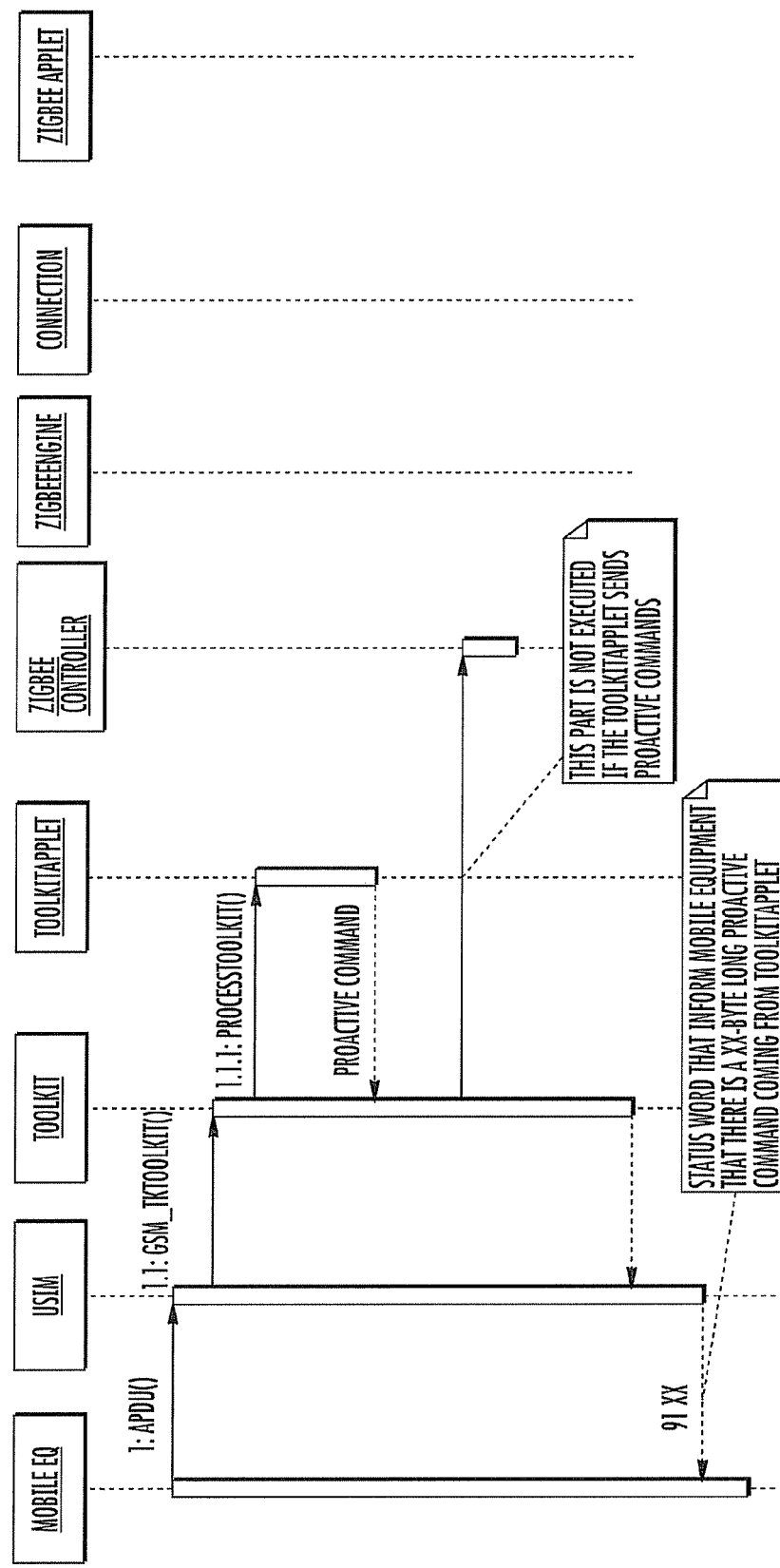
FIG. 4 is a schematic block diagram of temporarily storing one or more messages in a wireless communication, according to the present invention.

Otherwise, if a toolkit applet 4, registered on an event related to an APDU, sends a proactive command, two cases are substantially possible: the wireless controller 5 is capable of buffering a reasonable quantity of ZigBee messages. In this case, the toolkit applet 4 is executed and the ZigBee message is ignored. More particularly, such ZigBee message may be considered when the toolkit applet 4 may end with no more proactive commands to execute, as it is schematically represented in FIG. 4.

The second case is when the wireless controller 5 has limited buffer for ZigBee messages. In this case, the ZigBee applet 8 may be executed, but the toolkit 3 may prevent it from issuing proactive commands to avoid disturbing a current proactive session between the handset and the IC card.

Again, with reference to FIG. 1, in a phase A, the toolkit 3 executes a loop checking over all the toolkit applets 4 registered to an occurring event for serving them in succession. In a phase B, a second loop is executed for each ZigBee message detected by the wireless controller 5. In such second loop, the ZigBee message is fetched from the wireless controller 5. More particularly, if a ZigBee message is present, an event is generated depending upon the ZigBee message type and contents.

In order to preserve time constraints during specific APDU commands, for example, during network related commands such as authentication commands, the method provides a detecting and managing module for ZigBee messages, for example, temporarily excluding their delivery or execution.

Figure 8:
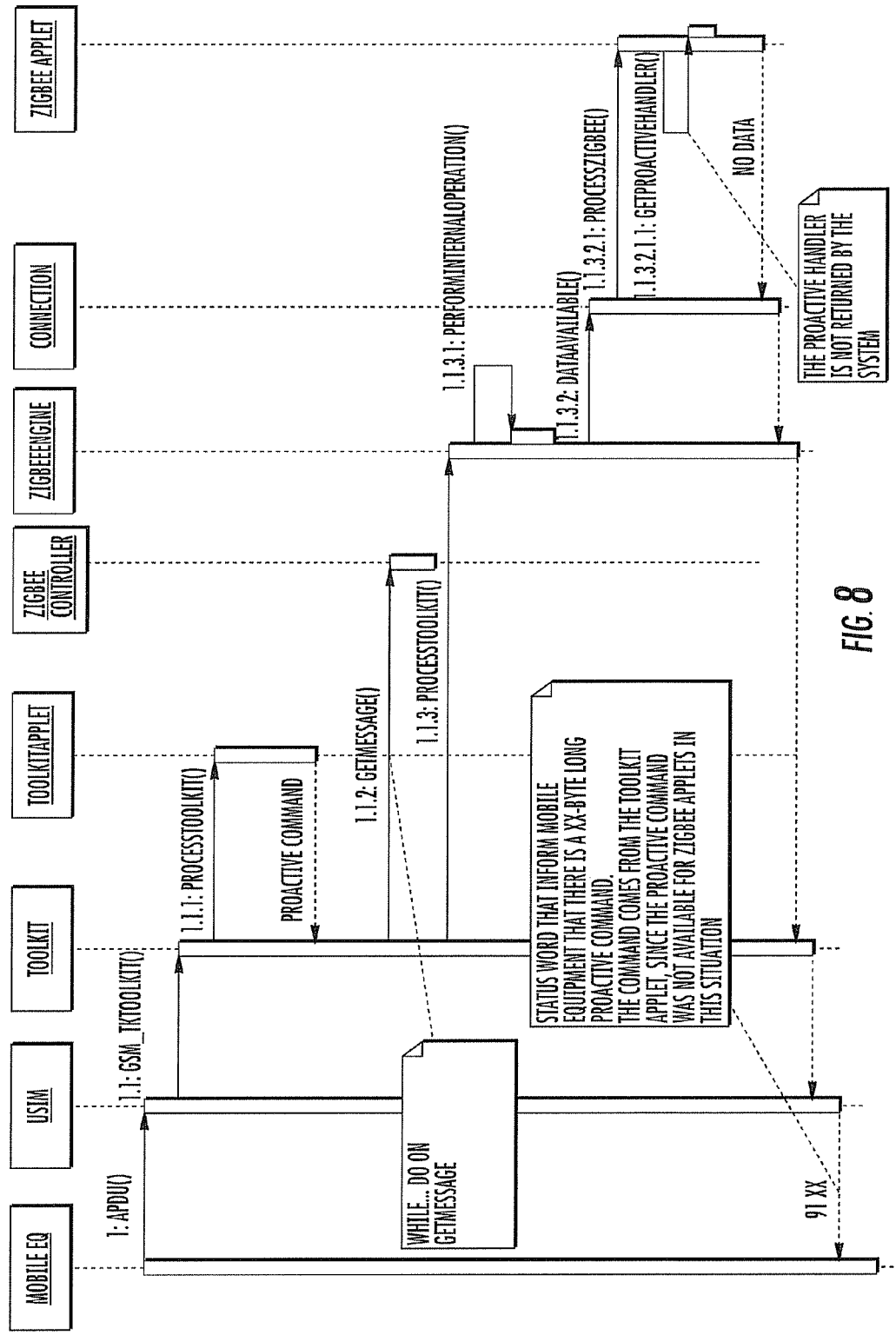
FIG. 8 is a schematic block diagram of a wireless service applet that runs in a degraded mode, according to the present invention.

Also, when an APDU has a bad ending, since proactive commands aren't allowed in this condition, triggering of a ZigBee applet 8 may be excluded (as shown in FIG. 4), or it can be executed in a degraded mode (as shown in FIG. 8), in order to avoid execution of proactive commands. Consequently the steps involved in managing ZigBee wireless personal communication events are not executed.

If the event is specific to a connection, for example, data being available for a given destination address of a second device, the corresponding ZigBee applet 8 is triggered and executed. If the event is general, for example, an external event such as the detection of a new end-point, or a new coordinator, a list of applet associated to the general event is executed.

A toolkit applet 4 may be registered to be executed when specific events occur. A specific event is generally associated to a specific code event, so that the toolkit applet 4 may be registered to the event through a function setEvent(eventcode). After registration, the toolkit applet 4 may call the ZigBee applet 8 every time the event corresponding to the specific eventcode occurs.

Figure 5:
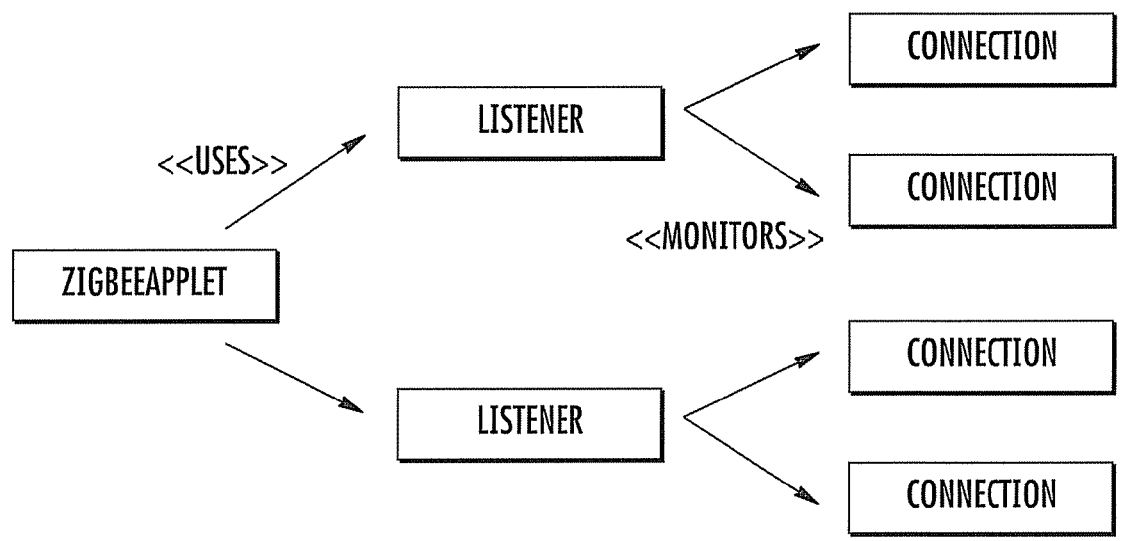
FIG. 5 is a schematic block diagram of an applet for a wireless communication, opening more than one connection, according to the present invention.
Figure 6:
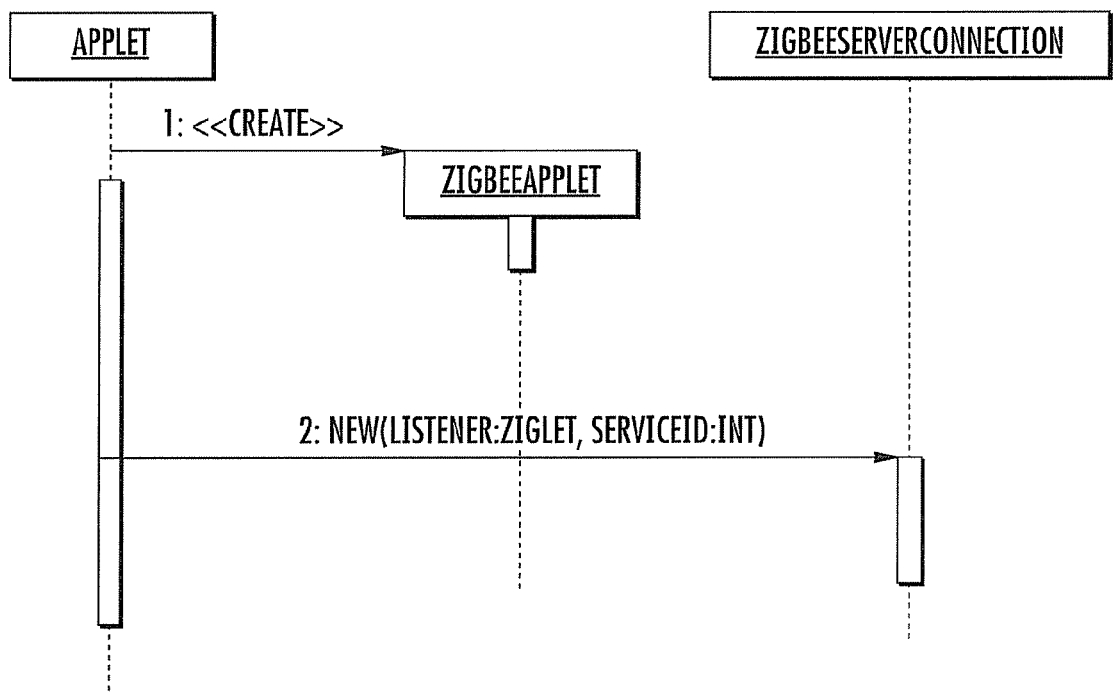
FIG. 6 schematically shows a wireless service applet, according to the present invention.

In the same way, a ZigBee applet 8 may be associated to an event calling a function setZigBeeEvent(zigBeeEventCode). The ZigBee applet 8 may also be associated to one or more connections. In this case, when a connection is established with a second device, the ZigBee applet 8 is designated to manage traffic of data on such connection. From a lower implementation point-of-view, a connection is managed as an instance of a connection class, for example, a ZigBeeServerConnection class. The ZigBee applet that reacts to the traffic is registered as a listener of the given Connection instance, as schematically represented in FIG. 5.

Advantageously, the association of the ZigBee applet 8 to one or more connections allows the ZigBee applet 8 to be associated to several connection objects, each of them managing exactly one connection with a different second device. This approach is preferred to the registration of the applet to the event, because the registration of the applet to the event allows management of a single connection.

The ZigBee applet 8 may be notified by events generated on a subset of connections or it may create a different listener, assigning to each listener a subset of connections, according to an object-oriented architecture. For example, a listener could be dedicated to handle pay-tv incoming messages, while a second listener could be used to handle home automation.

Advantageously, the association of a ZigBee applet to an event and its association to a connection are not mutually exclusive because the ZigBee applet 8 could use the first association to get registered to events that are not related to a specific connection, for example, status change notifications of the ZigBee device. Advantageously, according to the method, a wireless personal communication protocol between an IC card and a second reader device may be contemporaneously managed with a handset-IC card communication protocol between such IC card and a corresponding handset.

The handset-IC card communication protocol may comply with the ISO 7816 and ETSI TS 11.11 specification since the method avoids collisions with the wireless personal protocol. Advantageously, the IC card communicates in a typical way to a handset mobile and it also communicates through the wireless personal communication to the second reader device, external to the handset. The method implements the wireless personal communication and does not use a modification of the standard communication protocol at the base of the communication between the IC card and the handset.

That which is claimed:

1. A method of operating a wireless personal communication protocol between an integrated circuit (IC) card and a reader device, the IC card to be installed in and communicating with a handset through a handset-IC card communication protocol, the method comprising:
    transmitting an Application Protocol Data Unit (APDU) command from the handset to the IC card based upon the handset-IC card communication protocol;
    using the IC card to detect an association between the APDU command and an applet stored on the IC card;
    using the IC card to execute the APDU command;
    using the IC card to execute the applet if an association between the APDU command and the applet is detected;
    after the processing of the APDU command, using the IC card to detect data associated with a wireless personal communication with the reader device; and
    using the IC card to wirelessly exchange at least one command with the reader device, the reader device being separate from the handset.

2. The method according to claim 1 wherein the detecting of the data comprises parsing the detected data into at least:
    a message to be processed by IC card; and
    a command associated to the wireless personal communication protocol between the IC card and the reader device.

3. The method according to claim 2 wherein the command comprises a request for opening a connection between the IC card and the reader device.

4. The method according to claim 3 further comprising associating a wireless service applet to the connection for the wireless personal communication; and wherein a triggering of the wireless service applet is associated to a reception of the message on the associated connection.

5. The method according to claim 4 wherein the wireless service applet uses proactive commands based upon European Telecommunications Standards Institute Technical Standard (ETSI-TS) 11.14.

6. The method according to claim 4 wherein if the applet is being executed and at least one of the message or the command triggers the wireless service applet, the message including the command is temporarily stored.

7. The method according to claim 4 wherein if a function program associates the wireless service applet to an event, an execution of the wireless service applet is triggered by an occurrence of the event.

8. The method according to claim 4 wherein at least one connection class associates the wireless service applet to a connection with the reader device.

9. The method according to claim 1 wherein the detecting of the data comprises buffering the detected data if the applet is executing a proactive command to avoid interference between the handset-IC card communication protocol and the wireless personal communication.

10. The method according to claim 1 wherein the wireless personal communication protocol is based upon a ZigBee IEEE 802.15.4-2006 communication protocol.

11. The method according to claim 1 wherein the handset-IC card communication protocol comprises at least one of an ISO 7816 protocol or an ETSI TS 11.11 protocol.

12. The method according to claim 1 wherein the handset-IC card communication protocol is based upon an ETSI TS 11.14.

13. The method according to claim 4 wherein if the applet is being executed and at least one of the message or the command triggers the wireless service applet, the wireless service applet is executed for disabling issuance of a proactive command and avoiding disturbance of the execution of the applet.

14. A method of operating a wireless personal communication protocol between an integrated circuit (IC) card to be installed within a handset and a reader device, the IC card operating based upon a handset-IC card communication protocol, the method comprising:
    transmitting a command from the handset to the IC card, the command being based upon the handset-IC card communication protocol;
    detecting an association between the command and an applet stored inside the IC card;
    executing the command;
    executing the applet if an association between the command and the applet is detected;
    after the processing of the command, detecting data associated to a wireless personal communicatio7n with the reader device; and
    using the IC card to wirelessly exchange at least one command with the reader device, the reader device being separate from the handset.

15. The method according to claim 14 wherein the detecting of the data comprises parsing the detected data into at least:
    a message to be processed by IC card; and
    a command associated to the wireless personal communication protocol between the IC card and the reader device.

16. The method according to claim 15 wherein the command comprises a request for opening a connection between the IC card and the reader device.

17. The method according to claim 16 further comprising associating a wireless service applet to the connection for the wireless personal communication; and wherein a triggering of the wireless service applet is associated to a reception of the message on the associated connection or to the command.

18. The method according to claim 14 wherein the detecting of the data comprises buffering the detected data if the applet is executing a proactive command to avoid interference between the handset-IC card communication protocol and the wireless personal communication.

19. The method according to claim 14 wherein the command includes an Application Protocol Data Unit (APDU) command.

20. An integrated circuit (IC) card to be installed in and communicating with a handset based upon a corresponding handset-IC card communication protocol, the IC card comprising:
    a first module configured to receive a command from the handset based upon the handset-IC card communication protocol;

a second module configured to detect an association between the command and an applet stored in the IC card and associated to the command;

a third module configured to execute the command and the applet if the command is associated to the applet;

a fourth module configured to detect, after the processing of the command, data associated to a communication with a reader device external to the handset; and a fifth module configured to wirelessly exchange at least one command with the reader device, the reader device being separate from the handset.

21. The IC card according to claim 20 further comprising a sixth module configured to store data associated with the handset-IC card communication and/or data associated to the wireless personal communication with the reader device.

22. The IC card according to claim 20 wherein the command includes an Application Protocol Data Unit (APDU) command.

23. An integrated circuit (IC) card to be installed in and communicating with a handset based upon a corresponding handset-IC card communication protocol, the IC card comprising:

means for receiving a command from the handset based upon the handset-IC card communication protocol;

means for detecting an association between the command and an applet stored in the IC card and associated to the command;

means for executing the command and the applet if the command is associated to the applet;

means for detecting, after the processing of the command, data associated to a communication with a reader device external to the handset; and means for wirelessly exchanging at least one command with the reader device, the reader device being separate from the handset.

24. The IC card according to claim 23 further comprising means for storing data associated with the handset-IC card communication and/or data associated to the wireless personal communication with the reader device.

25. The IC card according to claim 23 wherein the command includes an Application Protocol Data Unit (APDU) command.

26. An integrated circuit (IC) communicating with a handset based upon a corresponding handset-IC card communication protocol, the IC comprising:

a first module configured to receive a command from the handset based upon the handset-IC card communication protocol;

a second module configured to detect an association between the command and an applet stored in the IC and associated to the command;

a third module configured to execute the command and the applet if the command is associated to the applet;

a fourth module configured to detect, after the processing of the command, data associated to a communication with a reader device external to the handset; and a fifth module configured to wirelessly exchange at least one command with the reader device, the reader device being separate from the handset.

27. The IC according to claim 26 further comprising a sixth module configured to store data associated with the handset-IC card communication and/or data associated to the wireless personal communication with the reader device.

28. The IC according to claim 26 wherein the command includes an Application Protocol Data Unit (APDU) command.

* * * * *

UNITED STATES PATENT AND TRADEMARK OFFICE
CERTIFICATE OF CORRECTION

PATENT NO. : 8,469,267 B2
APPLICATION NO. : 12/439228
DATED : June 25, 2013
INVENTOR(S) : Varone et al.

It is certified that error appears in the above-identified patent and that said Letters Patent is hereby corrected as shown below:

In the Claims:

Column 8, Line 33    Delete: "communicatio7n"
                     Insert: --communication--

Signed and Sealed this
First Day of October, 2013

Teresa Stanek Rea
*Deputy Director of the United States Patent and Trademark Office*